UNITED STATES PATENT OFFICE.

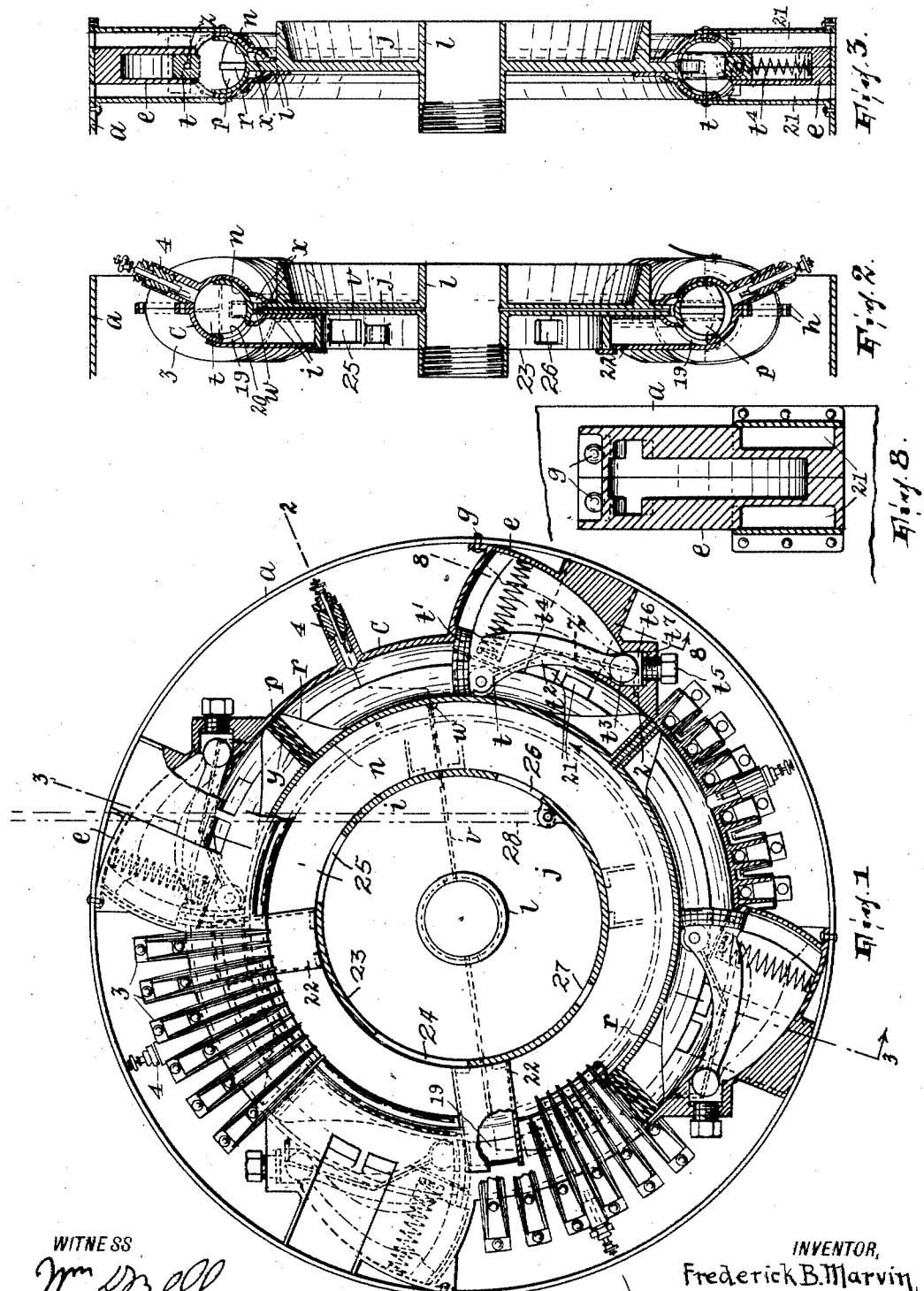
F. B. MARVIN.
ROTARY EXPLOSION ENGINE.
APPLICATION FILED AUG. 14, 1919.
1,366,919.　　Patented Feb. 1, 1921.
3 SHEETS—SHEET 1.
WITNESS
INVENTOR,
Frederick B. Marvin
BY
ATTORNEY F. B. MARVIN.
ROTARY EXPLOSION ENGINE.
APPLICATION FILED AUG. 14, 1919.
1,366,919.
Patented Feb. 1, 1921.
3 SHEETS—SHEET 2.
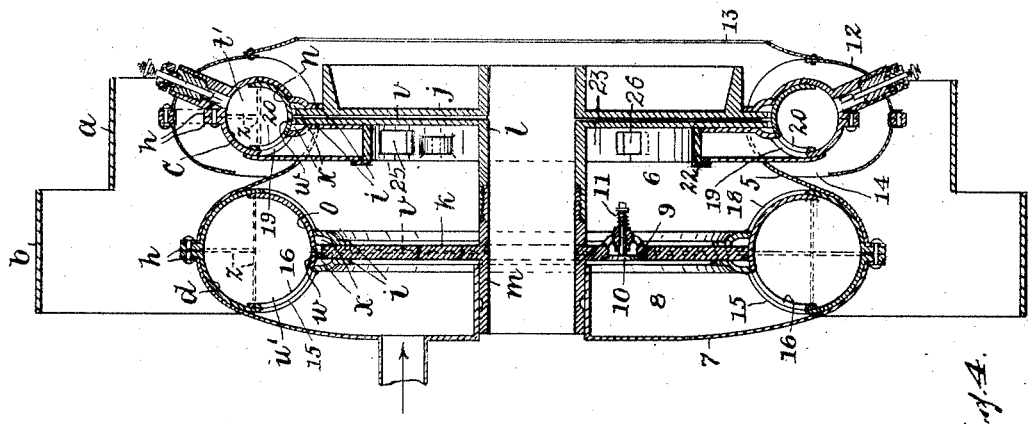
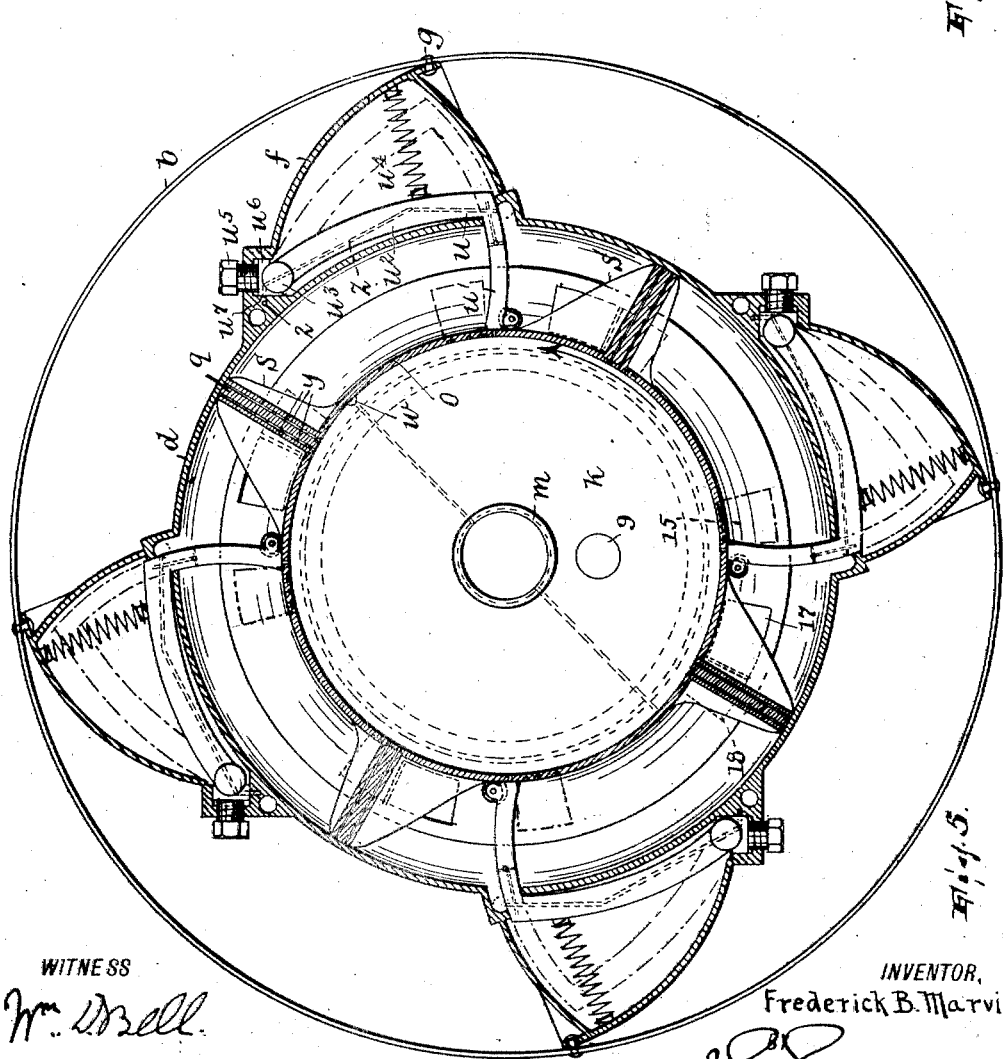
WITNESS
Wm. D. Bell
INVENTOR,
Frederick B. Marvin,
ATTORNEY.

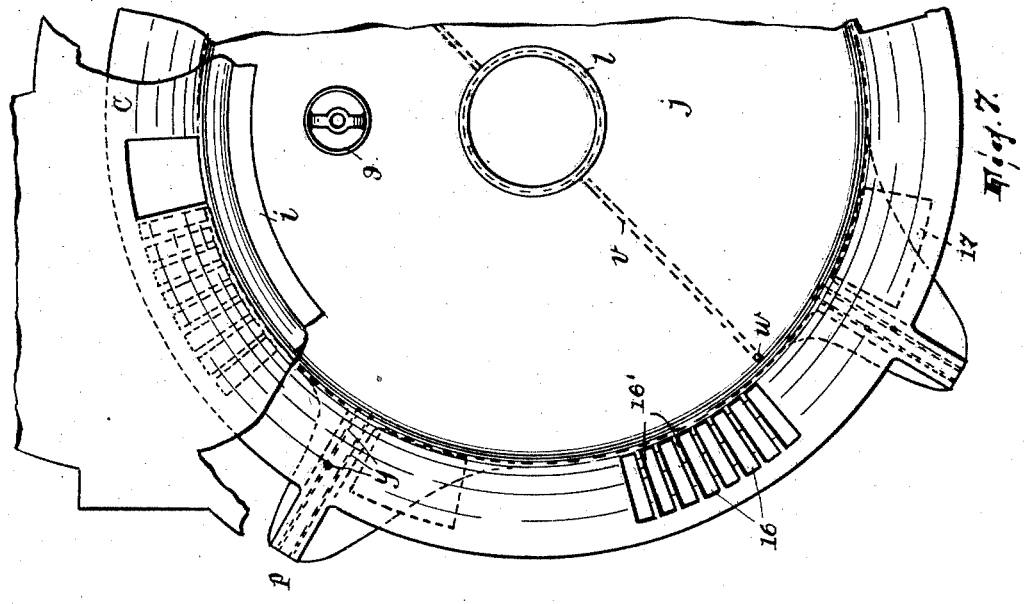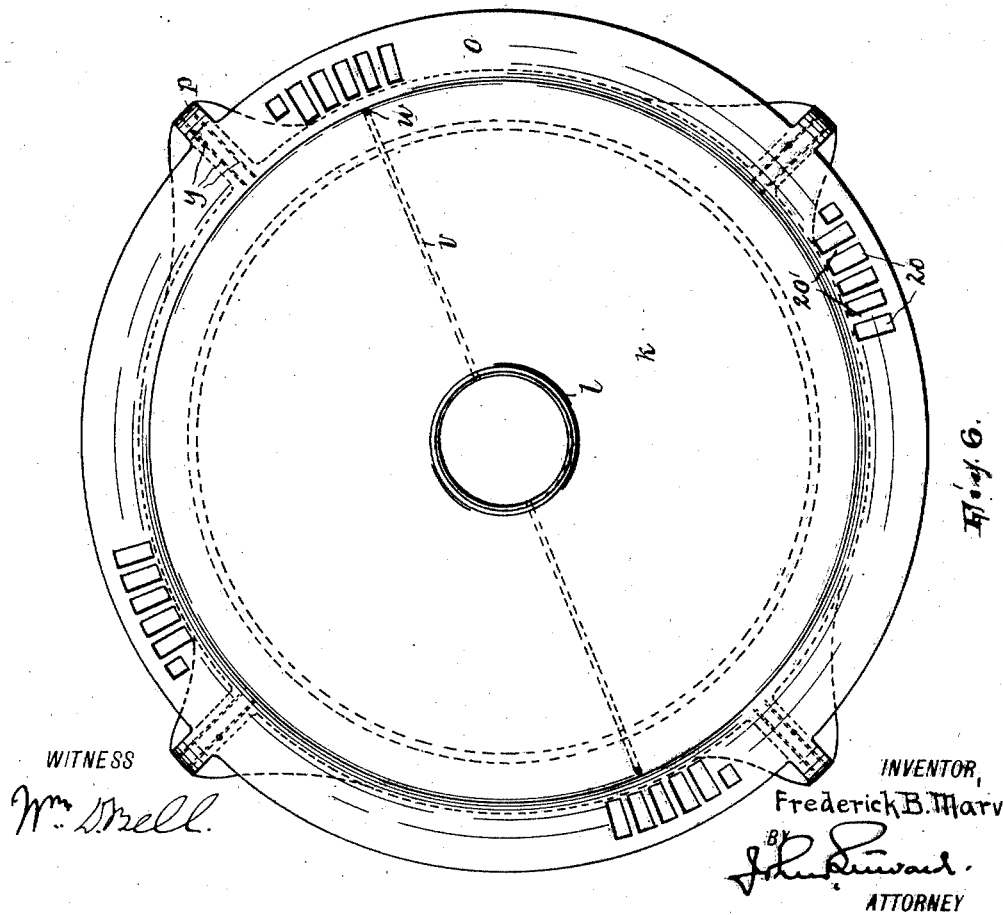

FREDERICK B. MARVIN, OF PORT JERVIS, NEW YORK.

ROTARY EXPLOSION-ENGINE.

1,366,919.  Specification of Letters Patent.  Patented Feb. 1, 1921.

Application filed August 14, 1919. Serial No. 317,409.

*To all whom it may concern:*

Be it known that I, FREDERICK B. MARVIN, a citizen of the United States, residing at Port Jervis, in the county of Orange and State of New York, have invented certain new and useful Improvements in Rotary Explosion-Engines, of which the following is a specification.

This invention relates to internal combustion machines and general objects thereof are to provide a practical and efficient machine of this class which may be built at a minimum of cost and be compact in form, light in weight and durable in construction. Other and more particular objects of invention and certain advantages consequently attained by the machine herein set forth will be apparent to those skilled in the art in the light of the following description.

In the accompanying drawings I show by way of example one embodiment of my invention, but it will be understood that I do not wish to be limited to any of the details thereof, except as pointed out in the appended claims.

Figure 1 being a view of the motor of the machine partly in side elevation and partly in section in a plane at right angles to its axis and nearly central of the motor;

Figs. 2 and 3 sectional views of the motor approximately on lines 2—2 and 3—3, respectively, of Fig. 1;

Fig. 4 a sectional view of the machine, including both the motor and compressor, in section approximately on line 2—2, Fig. 1;

Fig. 5 showing the compressor of the machine in section in a plane at right angles to its axis and nearly central of the compressor;

Fig. 6 being a side elevation of the motor rotor;

Fig. 7 a similar view of the compressor rotor, a fragment of the stator appearing in elevation; and Fig. 8 a sectional view on line 8—8, Fig. 1.

The machine as shown is characterized by a fixed structure, or stator, and a rotary structure, or rotor, which in the illustrated embodiment are concentric, the rotor being the inner structure.

$a$ and $b$ (Figs. 1, 4 and 5) are two annular rims for the motor and compressor, respectively. Within and concentric with these rims are the tubular annuli $c$ and $d$, which are much less in diameter than the rims and have outwardly projecting and equidistantly arranged housings $e$ and $f$, respectively, by which each annulus is fixed, as by rivets or the like $g$, with respect to the corresponding rim; it will be convenient to form the annuli and their housings in two substantially counterpart sections with stiffening flanges $h$ riveted together, as shown in Figs. 2 and 4. The annuli, which I hereinafter term cylinders (one of the motor and the other of the compressor), are not uninterruptedly tubular in cross-section, but each opens inwardly continuously, the edges of the material preferably converging inwardly, so as to leave annular lubricating channels $x$, as will appear, and terminating as parallel flanges or cheeks $i$.

$j$ and $k$ are two disks having central hubs $l$ and $m$ screwed together to form a single hollow shaft and also formed at their perimeters with semi-cylindrical (outwardly channeled) annuli $n$ and $o$, the disks fitting in each instance between the cheeks or flanges $i$ and the annuli $n$ and $o$ fitting the annuli $c$ and $d$. Abutments or heads $p$ are formed on the motor annulus $n$ (Fig. 1) and similar abutments or heads $q$ on the compressor annulus $o$ (the disks $j$ $k$ thus forming what I hereinafter term pistons), and in each instance these are equidistantly arranged around the annulus and are the same in number as the housings $e$ or $f$; cam ribs $r$, one to each abutment $p$, and similar cam ribs $s$, one to each abutment $q$, rise from the deepest portions of the annuli $n$ $o$, their summits being coincident with the summits of the corresponding abutments.

$t$ and $u$ designate shiftable abutments, of the motor and compressor, respectively, coactive with the abutments $p$ $q$ to form segmental explosion chambers of the annular space produced by the annuli $c$ $n$ and $d$ $o$. In the illustrated form each abutment $t$ includes a head $t'$ and a shank $t^2$ projecting rearwardly (relatively to the direction of rotation—see arrows, Figs. 1 and 5) and having a pivot $t^3$ on which the abutment may swing into and out of the housing under the opposing influences of a passing cam rib $r$ and a spring $t^4$ interposed between the abutment and the outer wall of the housing. To take up any lost motion of the abutment a set screw $t^5$ may be provided, $t^6$ being a bearing block affording a seat for pivot $t^3$ shiftable under pressure of the screw in a suitable way $t^7$ in the housing. In the illustrated form each abutment $u$ of the compressor simulates the abutments $t$ of the motor, except that it is preferably reversed; that is to say, its shank $u^2$ projects relatively forwardly from its head $u'$, which is curved and has its concave side facing the direction of rotation, the pivot $u^3$, spring $u^4$, set-screw $u^5$, bearing-block $u^6$ and way $u^7$ being substantially the same in form and function as the parts $t^3$, $t^4$, $t^5$, $t^6$ and $t^7$ for each abutment of the motor. It will be understood that the difference in the form and arrangement of the abutments for the motor and of those for the compressor is not indispensable, being designed to give the best results according as on the one hand pressure (explosion) is suddenly applied and on the other (pumping) gradually applied.

The disks $j$ and $k$ are shown provided with radial ports $v$ leading from the hollow shaft $l\,m$ to the transverse ports $w$ which connect the lubricant channels $x$ hereinbefore mentioned. Lubricant supplied to the ports $v$ (as through the shaft $l\,m$ by suitable instrumentalities, not shown) will find its way, by centrifugal action, to channels $x$, whereby the wiping faces of the pistons and cylinders will be lubricated, and from channels $x$ to intersecting ports $y$ (Figs. 1 and 5) in the abutments $p\,q$, whereby the wiping faces of the latter and the cylinders will be lubricated. Each abutment $t\,u$ is shown provided with lubricant ports $z$ adapted to communicate with a port 2 on the housing $e\,f$ (to be supplied with lubricant in any manner) and convey the lubricant to wiping surfaces of the abutment and housing.

Means for cooling the motor are shown at 3 between the housings $e$; also between the housings $e$ are shown ignition means 4 for the motor in the form of spark plugs.

A shell 5 forms between the motor and compressor a space 6 for fluid fuel under pressure; except for ports from the compressor whereby the fluid is delivered to said space and ports to the motor whereby the latter takes fluid from said space, and except also for a certain valved relief port or ports, the latter is hermetically sealed. The shell may be extended, as at 7 in Fig. 4, to the outer side of the compressor to form a chamber 8 to which the carbureted mixture or other fluid fuel is delivered, as from a manifold provided with carbureting means: communication between chambers 6 and 8 is possible, under certain conditions, by the aforesaid relief port or ports, 9, in disk $k$ (only one such port being shown), the same being normally closed by check-valves 10 seating toward chamber 6 and normally held so seated by springs 11. Another shell 12 is shown housing the motor, but so as to leave an opening 13, 14 in each side thereof. With suitable means (not shown, as a sirocco fan, for example attached to the right-hand end of shaft $l\,m$ in Fig. 4) provided, air for circulation around and cooling the motor may be drawn into this shell, entering at 13 and discharging at 14.

The fluid fuel is taken into the compressor through ports 15 and port groups 16 (Figs. 4 and 7) in the outer lateral walls of the cylinder $d$ and piston $o$; and it is delivered by the compressor through ports 17 (Fig. 5) and 18 (Fig. 4) in the inner or opposite lateral walls of said piston and cylinder, respectively, when such ports register with each other. Similarly, the fluid is taken from chamber 6 into the motor through ports 19 and port groups 20 (Figs. 4 and 6) in the inner lateral walls of cylinder $c$ and piston $n$, respectively, when such ports register with each other; but the exhaust from the motor leaves via ports 21 in the perimeter of the motor cylinder (Figs. 1, 3 and 8) when the abutments $p$ clear such ports. In the illustrated embodiment these ports 21 are formed both sides of the housings, while the intake ports 20 are formed by radial throats 22. (The positions of the compressor and motor cylinder intake and exhaust ports 15 and 19 and 18 and 21 with reference to the non-rotary abutments $u$ and $t$, respectively, will be apparent in Figs. 1 and 5). An important feature of the intake of each element (motor and compressor) is the port group 16 20 for each of its four units. A single port, if made large enough to admit adequate volume of fluid for high speeds, would at the inception of each influx afford communication past each non-rotary or cylinder abutment $t$ and $u$, laterally thereof, between the two cylinder spaces ahead of and behind it; the ports of each group being arranged in annular sequence, separated by intervening material, the latter forms a valve or cut-off to prevent communication between said spaces as indicated at 16′ 20′.

The operation will be apparent to those skilled in the art: When the machine is operating the cams on the pistons of motor and compressor shift the abutments $t\,u$ outwardly, their springs returning them at once the cams have passed. As to the motor, when each port group 20 passes the intake port 19 fluid (abutment $t$ being then inwardly seated) is drawn into the cylinder space behind the adjoining piston abutment $p$ and at the proper moment is fired, imparting a rotary impulse to the piston, the exhaust from said space then occurring when said piston abutment uncovers the next pair of exhaust ports 21. As to the compressor, when each port group 16 passes an intake port 15 fluid (abutment $u$ being then inwardly seated) is drawn into the cylinder space behind the adjoining piston abutment $q$ (it may be remarked that in the present adaptation port groups 16 bear approximately the same relation in degrees of a circle to abutments $q$ of the compressor piston as port groups 20 bear to abutments $p$ of the motor piston, see Figs. 6 and 7) and after the abutments $u$ have performed their outward and inward movements the fluid thus drawn into each such space is compressed between each abutment $q$ and the abutment $u$ immediately ahead of it until port 17, just forward of such abutment $q$, registers with port 18, when the compressed charge is expelled into chamber 6.

The reservoir or accumulator 6 preferably has appreciably greater capacity than the motor, and as the fluid is pumped into the reservoir faster than it is withdrawn by the motor (note that the compressor cylinder is of greater capacity than the motor cylinder—Fig. 4) it is possible to maintain a pressure in the reservoir which (dependent on the resistance of valve 10) will not only be sufficient to render the charge instantaneously and completely ignitible, assuming fuel mixtures are used, as is usually the case, that require to be compressed for this purpose, but will become a material factor in actually driving the motor; in fact, the machine may be readily started when sufficient pressure of the reserve fluid remains in chamber 6 upon turning the rotor sufficiently to bring the port groups 20 into registry with the ports 19.

Certain novel and advantageous structural features of my machine may be noted to wit: That the machine is in large measure capable of being and in fact is herein illustrated as formed of stamped metal; that the annuli $c$ $n$ and $d$ $o$ follow the form of a tube in cross-section, thereby insuring equal distribution of wear and hermetic joints between the wiping portions of the pistons and cylinders; that the cylinders are reinforced by their flanges $h$; that the pistons are inwardly subject to lubricant, which due to their arcuate form in cross section finds its way readily outward between the said wiping surfaces, the flow to the channels $x$ themselves (which abut the annuli $n$ $o$ directly) being subject to centrifugal force, as already stated; that the flow of fluid through the motor cylinder is from points radially inward thereof to points radially outward thereof, so that centrifugal force is more or less active on the fluid, which is of especial advantage in insuring complete evacuation of the cylinder on exhaust; and that the reservoir 6 is so disposed as to be between the (coaxial) compressor and motor; that in the case of either the motor or compressor, the rotor and stator elements, one of which is a cylinder and surrounds the other and the other of which has a piston contained in the cylinder, together form a lateral concavity capable of being utilized as a part of an inclosed fluid space (6 or 8); and that one side of an inclosed space for fluid (6 or 8) is actually formed by a rotor of the machine.

As shown in Figs. 1, 2 and 4, a valve may be provided so as to take in a charge to the motor at one, two, three or all four intake points in the cycle. So far as I am aware, this is new in the art. Such a valve is in the present embodiment shown as a ring 23 having ports 24, 25, 26 and 27 and a device 28 for turning the same; the ports are arranged so that when the valve is turned in the counter clockwise direction in Fig. 1, first port 24 is opened, then port 24 and another port, as 25, are opened, then ports 24 and 25 and another port, as 26, are opened and finally all four ports are opened. Thus four, eight, twelve or sixteen explosions to a revolution may be effected. This is obviously an important feature of my invention. This feature, though shown applied to the motor, in preference to the compressor, is not necessarily limited to application to the former.

Having thus fully described my invention, what I claim and desire to secure by Letters Patent is:

1. The machine herein set forth including a rotary internal combustion motor member and a rotary fluid compressor member for the motor member arranged side by side, one of said members including a rotor element and a stator element one of which is a cylinder and surrounds and forms a concavity with the other element in the side of said member adjoining the other member, the space between said motor and compressor members being inclosed and forming a reservoir into which the compressor member delivers and from which the motor member draws fluid.

2. The machine herein set forth including a rotary internal combustion motor member and a rotary fluid compressor member for the motor member arranged side by side, each of said members including a rotor element and a stator element one of which is a cylinder and surrounds and forms a concavity with the other element in the side of said member adjoining the other member, the space between said motor and compressor members being inclosed and forming a reservoir into which the compressor member delivers and from which the motor member draws fluid.

3. The rotary machine herein set forth including a rotor element and a stator element, one surrounding the other and being a cylinder and the other having a piston portion contained in the cylinder, said elements together forming a lateral concavity, in combination with means to cover said concavity and thereby form an inclosed fluid space, said machine having means to connect said space with the interior of said cylinder.

4. The rotary machine herein set forth including a rotary internal combustion motor unit and a rotary compressor unit for the motor unit arranged side by side and spaced from each other, said units having opposite rotors and also stators surrounding the rotors, and a closed reservoir between motor and compressor into which the compressor delivers and from which the motor draws fluid having opposite sides thereof formed by said rotors.

5. The rotary compressor herein set forth including a circular rotor element and a circular stator element, one surrounding the other and being a cylinder and the other having a piston portion contained in the cylinder, said elements together forming on opposite sides of the compressor lateral concavities, in combination with means to cover each concavity and thereby form on opposite sides of the rotor a supply fluid space and a space for the fluid delivered by the compressor, said compressor having means to connect each space with the interior of the cylinder.

6. The rotary compressor herein set forth including a circular rotor element and a circular stator element, one surrounding the other and being a cylinder and the other having a piston portion contained in the cylinder, said elements together forming on opposite sides of the compressor lateral concavities, in combination with means to cover each concavity and thereby form on opposite sides of the rotor a supply fluid space and a space for the fluid delivered by the compressor, said compressor having means to connect each space with the interior of the cylinder, and a normally closed pressure-opened relief means connecting said space and adapted to open toward the supply space.

7. A rotary machine of the class described including an annular cylinder portion and an annular piston portion fitted the latter in the former, said portions in cross-section substantially conforming to the contours of concentric tubes.

8. A rotary machine of the class described including an annular cylinder portion and an annular piston portion fitted the latter in the former, the piston being formed annularly channeled, whereby pressure acting interiorly thereof will expand the wall of the piston against the cylinder wall.

9. An internal combustion motor including an annular cylinder portion and an annular piston portion fitted the latter in the former, the cylinder portion having a radially outwardly discharging exhaust port.

10. An internal combustion motor including an annular cylinder portion and an annular piston portion fitted the latter in the former, the former having means to admit an explosion fluid at a point at its inner perimeter and deliver exhaust at a point at its outer perimeter.

11. A rotary machine of the class described including an annular cylinder and an annular piston in the cylinder and each having a head partitioning the cylinder space, the cylinder having relatively forward of its head an intake port and the piston relatively behind its head a sequence of intake ports arranged substantially concentric to the cylinder and piston and successively adapted to register with the cylinder intake port, said piston having means between each of its two ports to cut off communication between the spaces forward and back of the cylinder head as said ports pass the same.

12. A rotary machine of the class described including an annular cylinder and a piston therein, the piston and cylinder having each a plurality of spaced heads partitioning the cylinder space and coacting with each other to form in the cylinder separate fluid receiving spaces, and the cylinder having inlets for admitting fluid to each of said spaces, in combination with a closure device for and common to said inlets movable to open one or more than one at a time of said inlets.

13. A rotary machine of the class described including an annular cylinder and a piston therein, the piston and cylinder having each a plurality of spaced heads partitioning the cylinder space and coacting with each other to form in the cylinder separate fluid receiving spaces, and the cylinder having at intervals around the same inlets for admitting fluid to each of said spaces, in combination with an annular valve arranged and rotative in substantial concentricity with said cylinder and having port means adapted on rotation of the valve to register with one or more than one of said inlets at a time.

In testimony whereof I affix my signature.

FREDERICK B. MARVIN.